Patented Sept. 14, 1937

2,092,813

UNITED STATES PATENT OFFICE 2,092,813

MOLD FOR RUBBER ARTICLES

Amos W. Oakleaf, Detroit, Mich., assignor to United States Rubber Products, Inc., New York, N. Y., a corporation of Delaware No Drawing. Application April 21, 1936, Serial No. 75,575

2 Claims. (Cl. 18—47)

This invention relates to molds for rubber articles, and in particular it relates to the treatment of the mold surface in order to prevent the adhesion of the rubber article to the mold. In general, the invention contemplates treatment of the mold by applying to its surface a water soluble acetic acid salt, more particularly an alkali-metal salt thereof such as sodium acetate.

In the manufacture of molded rubber articles it is generally necessary to provide some means of lubrication between the rubber article and the mold surface. Heretofore one of the principal materials used for accomplishing this purpose was a solution containing soap as the principal lubricating ingredient. While soap has certain lubricating advantages, it also has many disadvantages; for example, it presents a somewhat tacky surface to which foreign material readily adheres. Frequently the rubber articles are dusted with a soapstone powder prior to insertion in the mold. In such cases the soapstone clings to the soap solutioned surface of the mold so as to form a definite deposit of foreign material in the mold. When this occurs a molded article does not assume the clean, sharp profile or contour of the original mold. Consequently, the molds heretofore have required frequent cleaning which usually presents a difficult problem, particularly where a delicate or complex design is formed in the mold.

Various other lubricating solutions have been used but have not been satisfactory, either because of the foregoing reason or because the solution presented an insufficiently lubricated surface. During the vulcanization of rubber articles the mold sections are pressed together in order to cause the rubber to flow into the various indentations in the mold. When the mold surface is not sufficiently lubricated, it frequently occurs that the rubber in flowing into the mold indentations adheres in part to the mold surface to such an extent that other portions of the rubber fold over the adhering part. When this occurs, the previously coated surface of rubber folds inward and prevents the rubber from merging at such locations. As a result of the rubber not merging because of the presence of powdered soapstone, cracks appear at the surface of the finished article.

Another objectionable feature in the use of soap solution as a means of lubricating molds is that the soap solution and/or its foreign deposits adhere in part to the surface of the rubber and result in an undesirable appearance of the finished article.

It is, therefore, an object of my invention to provide a mold lubricant which produces a lubricating effect in a high degree.

Another object is to provide a lubricant which in itself will not be tacky, thereby preventing the adherence of foreign material thereto.

A further object is to provide a mold lubricant which will not discolor the surface of the rubber.

A still further object is to provide a mold lubricant which is inexpensive and which may be applied with ease.

These and other objects and advantages will appear more fully in the following detailed description.

With reference to the molds in which the lubricating material of my invention is used, I refer to pneumatic tire molds and various other molds in which either hard or soft rubber articles are molded. The material which is preferably used is a solution of commercial sodium acetate in the proportions of ¼% to 10% solution in water. I find, however, that the most desirable proportion is from 1% to 2%, by weight.

The solution, after it is prepared, may be applied to the mold either by brush or by a spraying operation, the latter method being preferable in production requirements.

Better results are obtained when the mold is hot before the application of the lubricating solution. This is desirable for the reason that almost as soon as the solution strikes the hot mold the moisture is evaporated, leaving a very thin, solid deposit of sodium acetate on the mold surface. In cases where the mold is cold before the application of the lubricating solution, the rubber as it is pressed into engagement with the mold tends to wipe the solution away from certain portions of the mold, thus leaving rubber in direct contact with the mold surface.

As distinguished from the soap solution, the sodium acetate solution forms a hard, dry, smooth surface, so that foreign material does not readily adhere to its surface. Furthermore, this lubricating characteristic is such that the rubber will flow freely, thus preventing the foldovers and the resulting appearance of cracks in the finished article.

Where a 1% to 2% solution of sodium acetate is used, the deposit or film of solid material on the mold is so slight that its building-up characteristic after repeated operations is comparatively negligible. Consequently, it is not necessary to clean the molds as frequently as has been the case when using conventional lubricating solutions.

Among the advantages of my invention, therefore, is the accomplishment of an efficient and economical method of treating molds, resulting in the production of a rubber article free from surface defects.

While I have described a certain preferred embodiment of my invention, it will be understood that modifications may be made within the spirit of the invention and the scope of the appended claims.

Having thus described my invention, what I claim and desire to protect by Letters Patent is:

1. In the manufacture of rubber articles by means of a mold, the step which comprises interposing between the contacting surfaces of the rubber article and the mold an alkali-metal salt of acetic acid.

2. In the manufacture of rubber articles by means of a mold, the step which comprises interposing between the contacting surfaces of the rubber article and the mold the sodium salt of acetic acid.

AMOS W. OAKLEAF.